March 26, 1940. H. M. GUINOT 2,194,851
DEHYDRATION OF ORGANIC LIQUIDS BY AZEOTROPIC DISTILLATION
Filed May 21, 1938 5 Sheets-Sheet 3

Patented Mar. 26, 1940

2,194,851

UNITED STATES PATENT OFFICE 2,194,851

DEHYDRATION OF ORGANIC LIQUIDS BY AZEOTROPIC DISTILLATION

Henri Martin Guinot, Niort, Deux-Sevres, France, assignor to Les Usines de Melle, Melle, Deux-Sevres, France, a joint-stock company of France Application May 21, 1938, Serial No. 209,315
In France May 25, 1937

9 Claims. (Cl. 202—42)

This invention relates to the dehydration of organic liquids by azeotropic distillation.

Continuous azeotropic dehydration consists essentially in distilling the product to be dehydrated in the presence of an entraining agent which forms with water and the actual product to be dehydrated, a ternary azeotropic mixture the boiling point of which is lower than that of each of the binary mixtures which are formed between the three substances present. It is therefore this ternary mixture which distils off first and which collects at the top of the dehydrating column. A part of this mixture is, after condensation and cooling, subjected to decantation in order to recover, by subsequent reflux condensation, the entrainer which constitutes the greater part of one of the layers in the decanter, whilst the aqueous layer or the one that is richer in water is treated in auxiliary apparatus for the separation of the dissolved products. The water thus exhausted is rejected whilst the recovered products are returned into the dehydrating column at suitable points. The aqueous layer, which is separated by decantation, always contains, in addition to the entrainer, a certain quantity of liquid to be dehydrated, which quantity varies according to each particular case.

The process would be more economical than it has previously been if it were possible to separate, in the decanter, a layer that is richer in water, and poorer in the product to be dehydrated and in the entrainer, than was formerly the case. There would thus be obtained, for the same volume of dehydrated product, a smaller quantity or residual aqueous layer to be treated; this would lead to a smaller expenditure of heat in the auxiliary columns which are used for the recovery treatment and which could then themselves be made of smaller diameter. Furthermore, it would only be necessary to return into the dehydrating column a smaller quantity of recovered products; in other words, an increase of the efficiency of the whole of the apparatus would be ensured.

It has already been proposed (see United States patent specification No. 1,670,053) in the case of the dehydration of alcohol, to effect the decantation of the ternary mixture at a temperature in the neighborhood of that which exists at the top of the dehydrating column by arranging, at the top of this column, a collecting and decanting device which receives the whole of the condensate. The aqueous layer thus obtained by warm decantation is removed at the desired speed, the other layer, together with the excess of aqueous layer, being refluxed in the column. In accordance with that proposal, the warm decantation, at a temperature that is equal to (or in the neighborhood of) the temperature at the top of the column, has been carried out either at the top of the column or in a decanter that is arranged outside it and suitably heat-insulated so as to be maintained at the desired temperature.

Whilst improving the conditions of decantation to a certain extent, the method of this previous proposal is not altogether satisfactory.

In the first place, the aqueous layer obtained by warm decantation, whilst it was richer in water and poorer in entrainer than the layer obtained by the usual decantation in the cold, still contained a relatively high percentage of entrainer, so that it was necessary to heat it first for the usual removal of entrainer before treating it to recover the dissolved alcohol.

Finally, in the case of the direct treatment of alcohols which contain volatile impurities, the latter were found to be dissolved in the aqueous layer in an extremely dilute form and their removal (which is essential because otherwise they would accumulate in the column and inhibit decantation) necessitated the employment of adjoining columns requiring a large consumption of steam.

Now it has been found that the disadvantages of the previous proposal and the former known practice can be obviated to a large extent by first decanting the condensed ternary mixture of minimum boiling point while at a temperature approximately equal to the temperature of the still head, withdrawing the aqueous layer, cooling it and subsequently decanting the same when cold. By proceeding in this manner the whole of the entrainer is removed from the aqueous layer finally obtained and, moreover, this layer contains a higher percentage of water than heretofore.

The process of dehydrating organic liquids by azeotropic distillation according to the present invention therefore consists essentially of first decanting the condensed ternary mixture of minimum boiling point while at a temperature approximately equal to the temperature of the still head, withdrawing the aqueous layer, cooling it and subsequently decanting the same when cold.

In a preferred way of carrying out the process of the present invention the first decantation of the ternary mixture while warm takes place at a point a few plates below the head of the column. This is most conveniently effected by constructing one plate of the column in such a manner as to form a decantation chamber inserted in the column near the top thereof, and is particularly advantageous when dehydrating liquids containing volatile impurities which must be separated, because these impurities are thus concentrated (and so made available for separation later on) within the column, on the plates above the decantation vessel by the heat available in the column and without any extra heat. This obviates the necessity of heating an auxiliary column for their concentration as is the case in the method according to the previous proposal above referred to, when decantation takes place at the head of the dehydrating column or near the head in the decanter separate from the column.

The present invention also includes a column for the dehydration of organic liquids by azeotropic distillation, which is provided with a decanting chamber situated within the still a few plates below the top thereof.

In the accompanying drawings which show, in a diagrammatic manner, apparatus suitable for carrying out the process of the present invention, Fig. 1 shows a sectional elevation of an apparatus suitable for the dehydration of ethyl alcohol;

Figure 1:
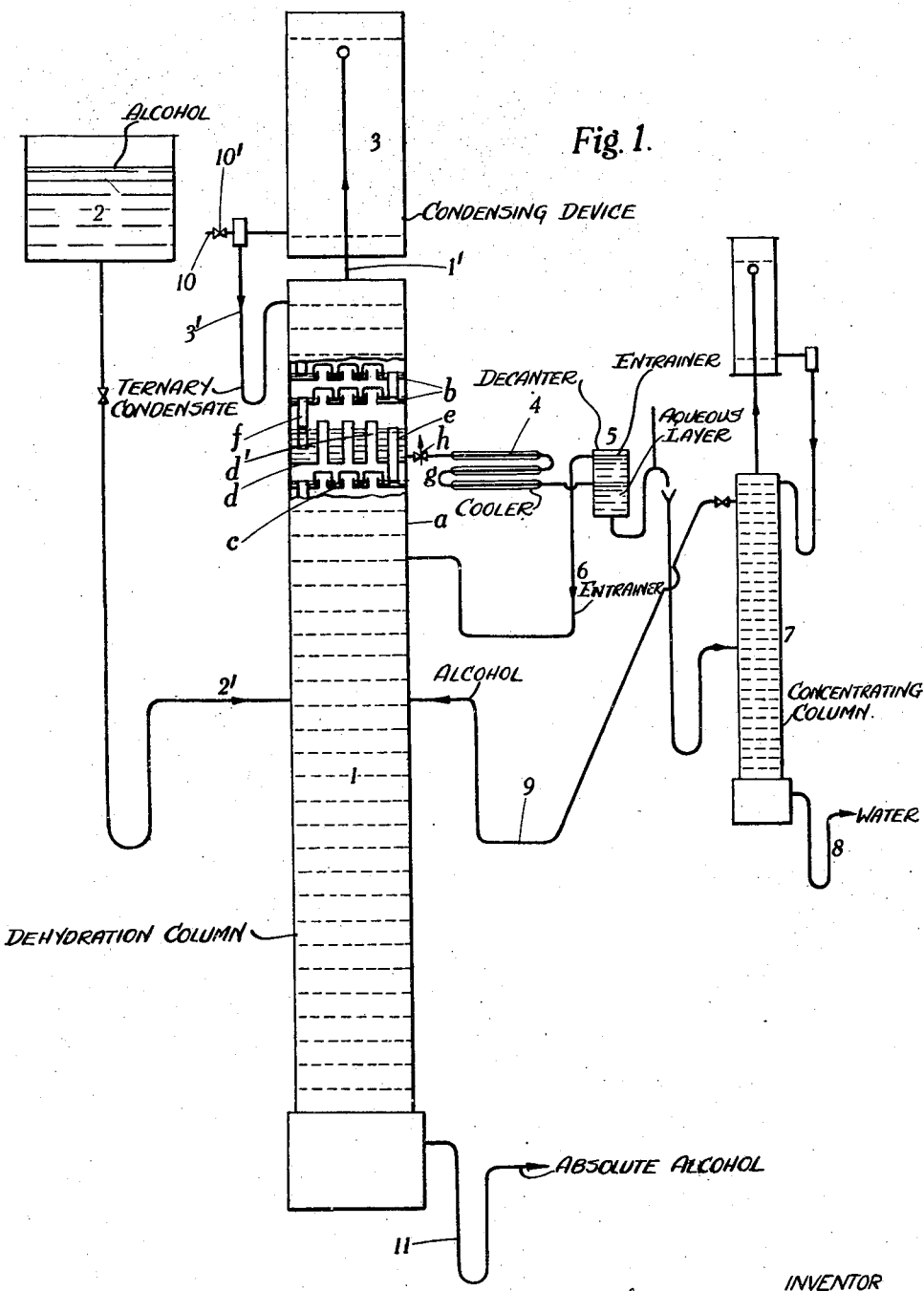

The apparatus shown in Figure 1 comprises the usual distilling column 1 with plates, which is normally charged with benzene in the known manner. The alcohol to be dehydrated comes from a vat 2 and is led into the column 1 by a pipe 2'. The top of the column is so constructed, as shown in this figure, that it comprises, below a certain number of ordinary plates $b$ with bells, a plate $d$ which forms the bottom of a chamber for the first decantation, which will be described in detail hereinafter. The top of the column 1 is connected by a pipe 1' to an ordinary condensing device 3 from which the ternary condensate of constant composition, which is assumed to be contaminated with volatile impurities (also known as head impurities) that were initially contained in the alcohol supplied, is entirely refluxed by the pipe 3' on to the top plate.

These head impurities are concentrated on the plates above the decantation chamber. Generally, it is sufficient to have four or five plates for carrying out this concentration which is thus effected, without external heat, by means of the heat supplied to the base of the dehydrating column. To remove the head products it is sufficient to draw off, at the desired rate from the condenser of the dehydrating column, through the pipe 10 provided with a cock 10', a very small fraction of the condensate which consists of an impure alcohol the concentration of which in head impurities is from 100 to 200 times as great as that of the aqueous layer of the warm decantation chamber. In this way, the impurities are obtained directly in a concentrated form and without auxiliary heating; this constitutes a great economy.

The decanting chamber will now be described in more detail with reference to Figure 2. It is formed as a chamber the bottom of which is a plate $d$ which has no bells but which is traversed by pipes $d_1$ which permit the free passage of the vapours from $c$ to $b$. The plate $d$ carries, in addition, one or more overflow pipes $e$ which open at a level that is sufficiently high to enable a suitable quantity of liquid to accumulate on the said bottom $d$. In this way, the liquid coming from the plate $b$ through the overflow $f$ has time to decant in the chamber thus formed by the plate $d$ and the wall $a$ before being emptied by the overflow $e$ to the underlying plate $c$.

In normal working, the decanter is substantially filled by the denser layer, that is to say by the aqueous layer, in the case of light entrainers. On this charge there floats a very thin film of upper layer which is rich in entrainer and which is emptied through $e$ continuously as shown in Figure 2.

A suitable quantity of aqueous layer can be drawn off through the discharge pipe $g$ which is provided with a regulating cock $h$; it is sufficient to draw off by means of $h$ a quantity of aqueous layer which corresponds to the quantity of water introduced by the alcohol supplied, in order to ensure automatically, by the surplus of aqueous layer and the whole of the upper layer, a reflux, which is suitable both in quantity and in quality, on to the underlying plates $c$.

Once the aqueous layer has been drawn off from the first warm decanting chamber, it is subjected to a cooling in the cooler 4 (Figure 1); it becomes turbid, because the entrainer which remained in the hot solution separates. The cooler is connected to a decanter 5; the top layer, which is formed in the latter and which contains practically the whole of the extracted entrainer, is returned in circuit into the dehydrating column by the pipe 6. As for the remaining aqueous layer it is now almost exclusively composed of water and alcohol which can be recovered by simple distillation. For this purpose, the aqueous solution is concentrated to a great strength in the adjoining column 7, and the recovered product is returned into the dehydrating column by a pipe 9 whilst the water is emptied through a pipe 8.

The absolute alcohol is collected by the pipe 11 at the bottom of the column 1.

The first decanting chamber may be suitably modified according to the particular liquid to be dehydrated and also according to the entrainer employed. Thus, in the case in which a liquid that is denser than water is employed as the entraining body, the decanting chamber is modified as shown in Figure 3, since the layer that is richer in water is then the upper layer in the chamber.

In this case, the discharge pipe $g$ for the aqueous layer opens into the top part of the decanting chamber $d$. The boiling liquid which arrives from the upper plates $b$ and $b'$ through the overflow $f$ finds an outlet only through the holes $j$ provided near the base of the pipe $i$ surrounding an overflow pipe $e$. In normal working, the chamber $d$ is completely filled with upper layer, that is to say, in the present case, with the aqueous layer. The desired quantity is taken from it through the pipe $g$ which is provided, as in the construction shown in Fig. 2, with a regulating cock $h$, whilst the bottom layer, which is rich in entrainer, flows away with the excess of upper layer through $j$—$i$—$e$, thus automatically providing the required reflux in suitable quantity and quality on to the underlying plates $c$.

It may be desirable to be able to draw off the bottom layer and the top layer simultaneously from the warm decantation chamber. In that case it is advantageous to use the device shown in Figure 4. The decantation chamber is divided into two compartments I and II by a partition $k$. The overflow of the liquid takes place in the compartment I as in the apparatus shown in Figure 2, whilst, in the other compartment II, it takes place as in the apparatus shown in Figure 3. The bottom layer is drawn off at the desired rate through the pipe $g_1$ which is provided with a cock $h_1$. In the compartment II on the right, the upper layer is drawn off through the pipe $g_2$, the drawing off being regulated by the cock $h_2$.

Figure 2:
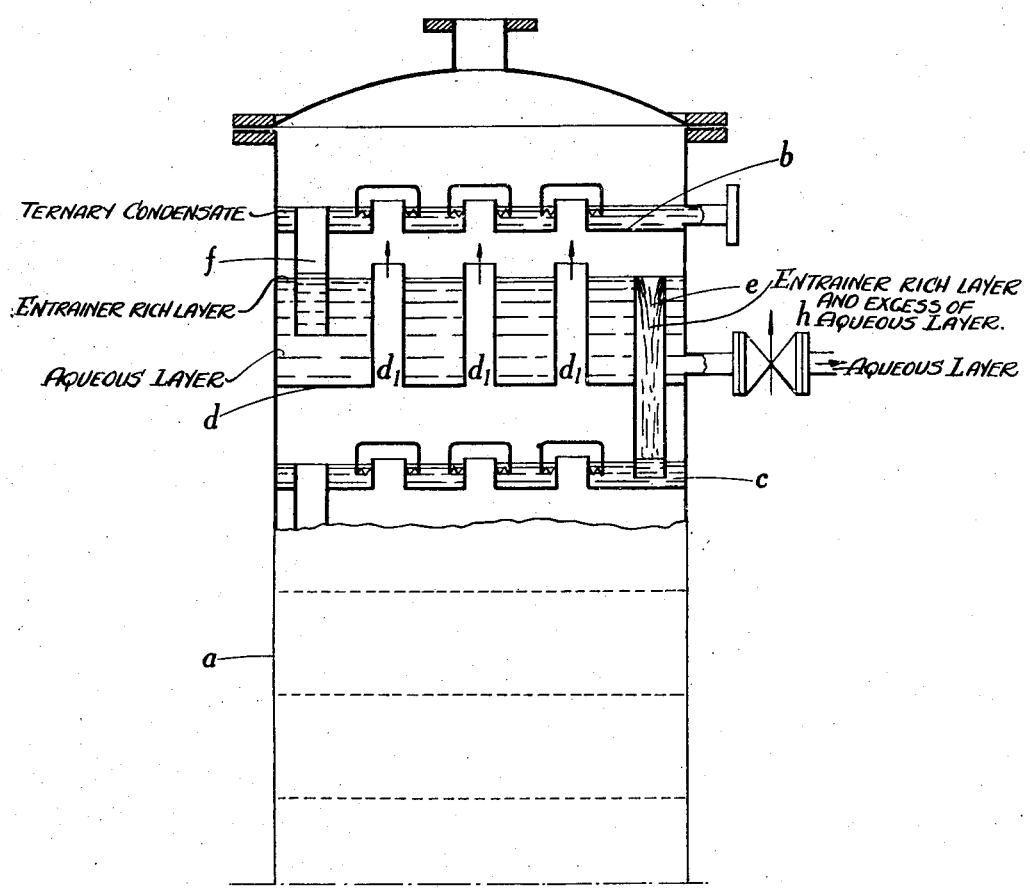
Fig. 2 shows, in sectional elevation and on a larger scale, a particular construction of the top part of the dehydrating column for those cases in which the decantation gives a lower aqueous layer.
Figure 3:
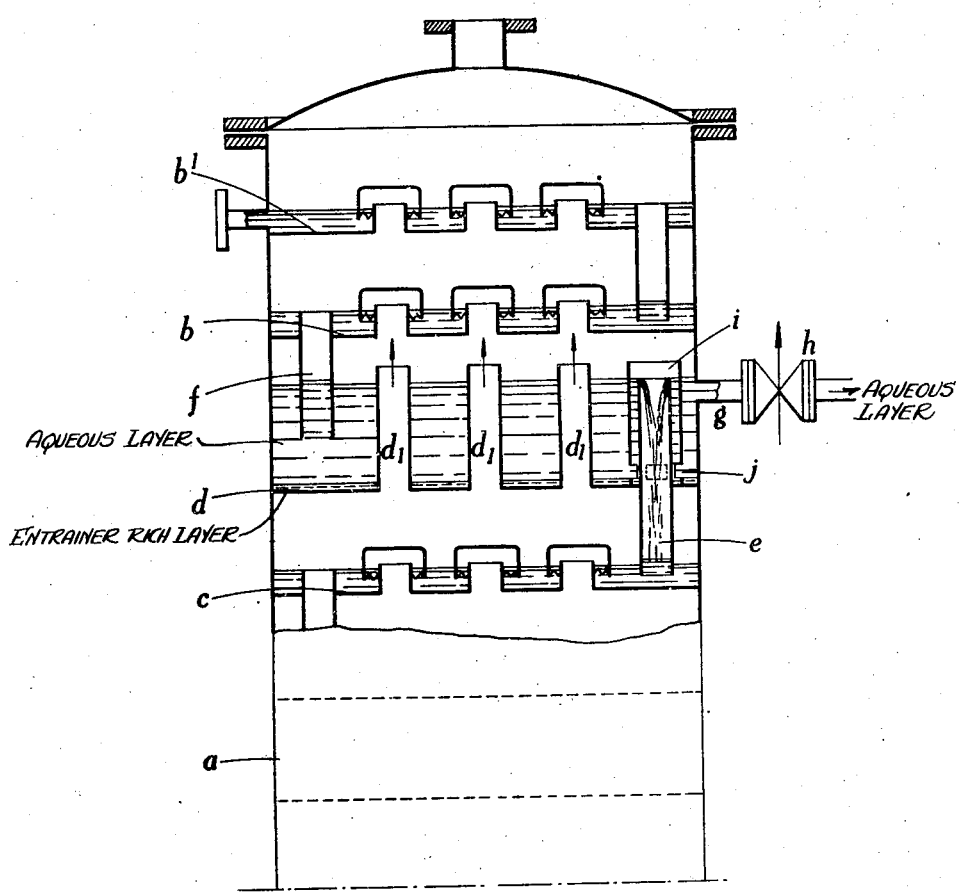
Fig. 3 is a sectional elevation of the construction of the top part of the dehydrating column for the case in which the aqueous layer is the top layer in the decanting chamber.
Figure 4:
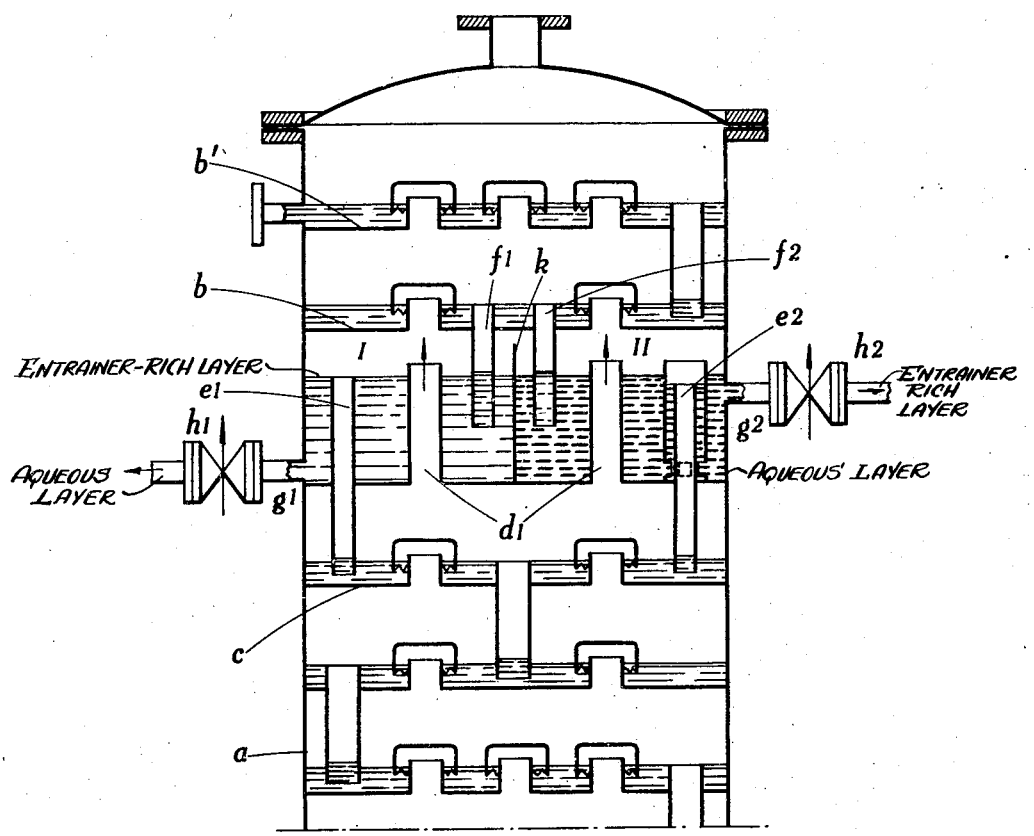
Fig. 4 is a similar sectional elevation showing a modification of the decantation chamber which enables both the lower layer and the top layer to be drawn off simultaneously.

A plant such as shown in Figure 1 with a decanting chamber formed as shown in any one of Figs. 2, 3 or 4 may be used indifferently for the treatment of pure initial materials, or, more advantageously, for the treatment of initial materials containing volatile impurities.

Examples of application of the invention will now be given.

Example I

This example relates to the dehydration of pure alcohols with apparatus such as is shown in Figure 1.

The layer that is rich in water is drawn off from the first decanting chamber in the desired quantity, by regulating the cock $h$, this layer having the following composition:

| | Per cent |
|---|---|
| Water | 54 |
| Alcohol | 36.5 |
| Benzene | 9.5 |

It is cooled outside the column in a cooler 4. The cold liquid becomes turbid. It is passed into a decanter 5 where it separates into two layers. The top layer, which is rich in benzene and which represents only a small fraction of the total liquid, is returned into the dehydrating column by the pipe 6. The bottom layer in the decanter 5 then has approximately the following composition by weight:

| | Per cent |
|---|---|
| Water | 59.7 |
| Alcohol | 40 |
| Benzene | 0.3 |

The quantity of benzene contained in this aqueous alcohol is therefore sufficiently small to be neglected without inconvenience. The recovery of the alcohol from the aqueous mixture up to the maximum concentration possible by rectification can thus be effected in a simple high-grade column 7 at the base of which the water is discharged through 8.

If only one decantation had been carried out in the cold as in the usual processes, the composition of the bottom layer would have been approximately as follows:

| | Per cent |
|---|---|
| Water | 36 |
| Alcohol | 53 |
| Benzene | 11 |

It is seen that in this case, for the same volume of water eliminated, there is recovered about twice as much alcohol as in the process according to the present invention. Consequently, the process of treatment according to the present invention enables not only the small column, generally employed for the separation of the benzene to be dispensed with, but the dimensions of the column for the recovery of alcohol to be reduced by about half. Moreover, the work of the dehydrating column itself is less because of this reduction which correspondingly diminishes the quantity recovered alcohol passing back into the dehydrating column.

Example II

This example relates to the dehydration of monobutylamine, the boiling point of which is 79° C. This product has a very strong affinity for water; and, in order to obtain a really anhydrous product, by distillation, it is advantageous to dehydrate it by azeotropic methods or, to dehydrate mixtures in which it is present in large quantities.

When cyclohexane is employed as the entrainer, and when working with the ordinary method of decantation in the cold, the composition of the lower layer, which is the more aqueous layer, is as follows:

| | Per cent |
|---|---|
| Monobutylamine | 39.4 |
| Cyclohexane | 25.8 |
| Water | 34.8 |

When the decantation is carried out in the neighborhood of the boiling point i. e., 79° C., the following composition is found:

| | Per cent |
|---|---|
| Monobutylamine | 14.8 |
| Cyclohexane | 0.5 |
| Water | 84.7 |

After cooling, and again decanting, the final aqueous layer contains practically none of the entrainer.

Example III

Figure 5:
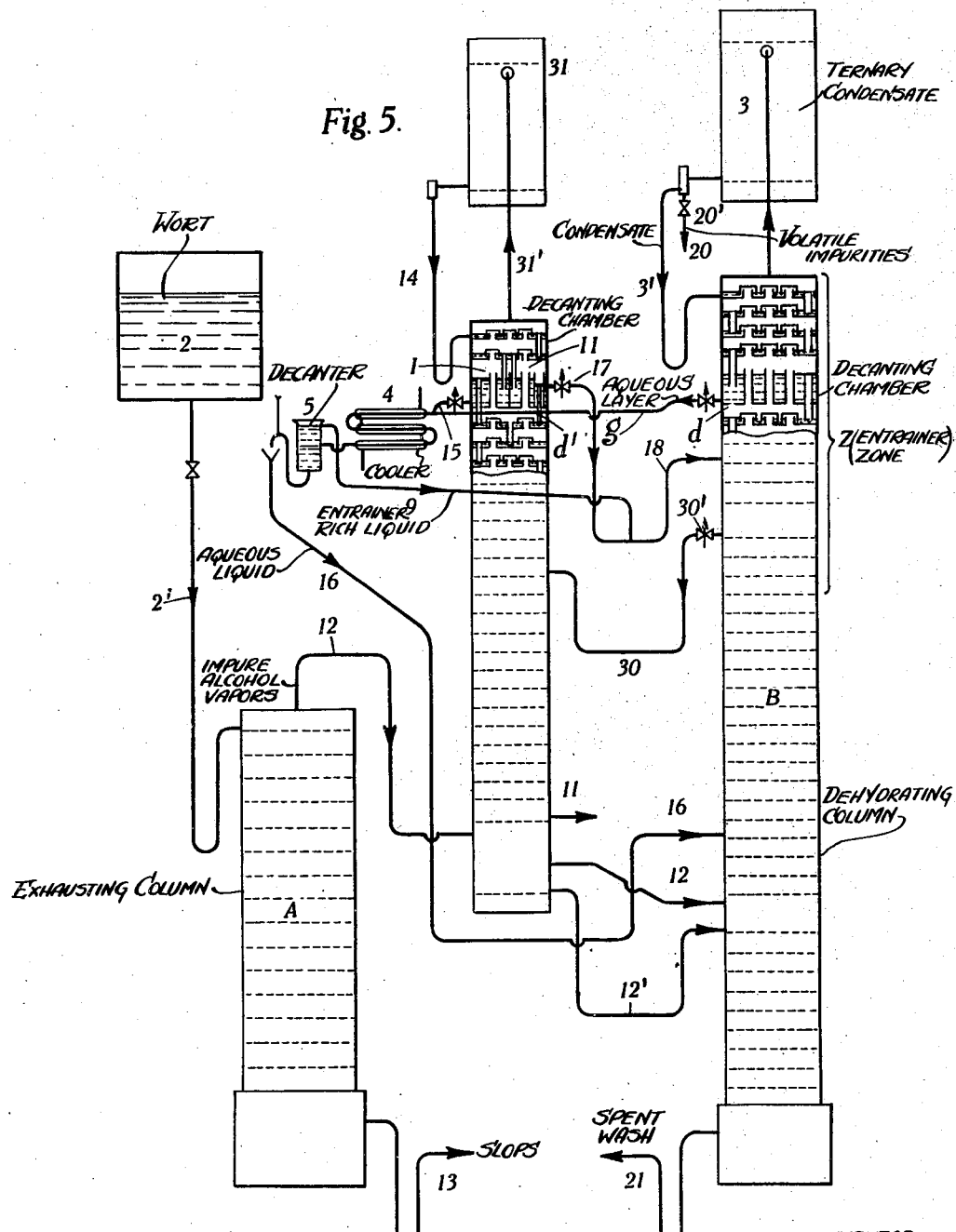
Fig. 5 represents an entire installation for carrying out the present invention as applied to the direct dehydration of fermented worts by the process described in United States patent specification No. 1,940,699.

This example and Figure 5 relate to the application of the process of decantation at a temperature approximately equal to the temperature of the still head, according to the invention, to the direct dehydration of fermented worts by the process described in the specification of United States Patent 1,940,699.

The wort contained in a vat 2 flows through a pipe 2' into an exhausting column at the base of which the slops are discharged through a pipe 13. The impure alcoholic vapours of low strength which leave the exhausting column through a pipe 12, enter the bottom part of the principal dehydrating column B, after having, on the way, given up some of their heat in a heat interchanger in the bottom of the end column C. The condensate resulting from this heating likewise enters the column B through a pipe 12'.

At the bottom of the column B, the spent wash flows away through the pipe 21. The alcoholic vapours, which rise in the column B, become progressively concentrated in alcohol and come into contact with the entraining body which is located in a zone Z of the top part of the column B. This zone of entrainer comprises in its middle part a decanting chamber $d$ which may be of the type represented in Figure 2. The ternary mixture, which is formed in this zone, separates into two layers therein; the aqueous layer is drawn off at the desired rate through a pipe $g$ and it is then, after being cooled in a cooler 4, subjected to a further decantation in the decanter 5. The top layer in this decanter 5, which is rich in entrainer, re-enters the zone Z through the pipes 9 and 18, whilst the aqueous layer is passed, through a pipe 16, back into the bottom part of the column B on to a plate on which the boiling liquid has approximately the same strength as itself.

The volatile impurities contained in the alcohol supplied are concentrated on the plates arranged between the decanter d and the top of the column. They are drawn off at the desired rate through the pipe 20, which is provided with a cock 20' for subsequent treatment, whilst the remainder of the condensate, which is formed in 3, is refluxed through the pipe 3' to the top of the column B.

In the lower part of the entrainer zone, a mixture consisting of alcohol of very high strength (97 to 99°) and a certain proportion of entrainer (20 to 30%) is drawn off by a cock 30' through a pipe 30. This mixture enters the middle part of the end column C the purpose of which is to separate the absolute alcohol which is drawn off at the base in 11 and, also, the ternary mixture which collects in the upper part.

The vapours escaping in 31' at the top of the column C are subjected to a total condensation in the condenser 31 and reflux entirely through the pipe 14. In the top part of the column C, there is formed a decanting chamber d arranged like that shown in Figure 4, that is to say, it comprises two compartments I and II and enables the top layer and the bottom layer to be drawn off at the same time. The aqueous layer on the one hand, is drawn off from I in order to ensure the dehydration in column C and the top layer, on the other hand, is drawn off from II so as to keep the charge of entrainer in the column B constant.

The bottom layer, which is drawn off at the desired rate through the pipe 15, is subjected, in cooler 4 and decanter 5, to the same treatment as the aqueous layer of the decanting chamber d of the main column B.

The top layer is drawn off through the pipe 17 and re-enters the entrainer zone of column B through the pipe 18.

The invention described and represented is applicable to the azeotropic dehydration of organic liquids such as chlorhydrins, amines, alcohols, ketones and the like.

What I claim is:

1. A method of dehydrating alcohol by azeotropic distillation comprising treating the hydrated alcohol in a dehydrating column in the presence of an entraining agent, collecting the condensed ternary azeotropic mixture formed, within the column at a point one or more plates below the top thereof, allowing said ternary mixture to decant, withdrawing the aqueous layer from said decantation, passing said aqueous layer through a cooling zone, transferring said cooled condensate to a decanter, withdrawing the entraining agent separated in said decanter, returning said entraining agent to the main dehydrating column, removing the aqueous layer from said decanter, transferring said aqueous layer from said decanter to a rectifying column, rectifying said aqueous layer, transferring rectified alcohol so formed back to said main dehydrating column, condensing and refluxing all the vapours passing from the head of the said main dehydrating column, withdrawing at the desired rate the volatile impurities from said condensate and withdrawing the dehydrated organic liquid from the foot of said main dehydrating column.

2. In the process of dehydrating organic liquids by azeotropic distillation employing an entraining agent which forms a ternary azeotropic mixture with water and the organic liquid to be dehydrated, the steps of first decanting the condensed ternary mixture of minimum boiling point at a temperature approximately equal to the temperature of the still head, withdrawing a proportion of the aqueous layer formed by said first decantation, cooling said aqueous layer, subsequently decanting said aqueous layer when cold and returning the entraining agent received from said subsequent decantation to the dehydrating column.

3. In the process of dehydrating organic liquids by azeotropic distillation employing an entraining agent which forms a ternary azeotropic mixture with water and the organic liquid to be dehydrated, the steps of first decanting the condensed ternary mixture of minimum boiling point at a temperature approximately equal to the temperature of the still head, withdrawing a proportion of the aqueous layer formed by said first decantation, cooling said aqueous layer, subsequently decanting said aqueous layer when cold returning the entraining agent received from said subsequent decantation directly to the dehydrating column and treating the aqueous layer from said second decantation in a rectifying column and returning the rectified liquid so obtained directly to the main dehydrating column.

4. In the process of dehydrating organic liquids by azeotropic distillation employing an entraining agent which forms a ternary azeotropic mixture with water and the organic liquid to be dehydrated, the steps of first decanting the condensed ternary mixture of minimum boiling point within the main dehydrating column at a temperature approximately equal to the temperature of the still head, withdrawing a proportion of the aqueous layer formed by said first decantation, cooling said aqueous layer, subsequently decanting said aqueous layer when cold and returning the entraining agent received from said subsequent decantation to the dehydrating column.

5. In the process of dehydrating organic liquids by azeotropic distillation employing an entraining agent which forms a ternary azeotropic mixture with water and the organic liquid to be dehydrated, the steps of first decanting the condensed ternary mixture of minimum boiling point within the main dehydrating column and one or more plates below the top of said column, withdrawing a proportion of the aqueous layer formed by said warm decantation, cooling said aqueous layer subsequently decanting said aqueous layer when cold and returning the entraining agent received from said subsequent decantation to the dehydrating column.

6. In the process of dehydrating organic liquids by azeotropic distillation employing an entraining agent which forms a ternary azeotropic mixture with water and the organic liquid to be dehydrated, the steps of first decanting the condensed ternary mixture of minimum boiling point within the main dehydrating column, one or more plates below the top of said column, and at a temperature approximately equal to the temperature of the still head withdrawing a proportion of the aqueous layer formed by said first decantation, cooling said aqueous layer, subsequently decanting said aqueous layer when cold, returning the entraining agent received from said subsequent decantation directly to the dehydrating column and treating the aqueous layer from said subsequent decantation in a rectifying column and returning the rectified organic liquid so obtained directly to the main dehydrating column.

7. In the process of dehydrating organic liquids containing volatile impurities, by azeotropic distillation employing an entraining agent which forms a ternary azeotropic mixture with the water and the organic liquid to be dehydrated, the steps of first decanting the condensed ternary mixture of minimum boiling point within the main dehydrating column and one or more plates below the top of said column, withdrawing a proportion of aqueous layer formed by said first decantation, cooling said aqueous layer, and subsequently decanting said aqueous layer when cold returning the entraining agent received from said subsequent decantation to the dehydrating column, concentrating the impurities in said organic liquid in that part of the column between the column head and the warm decantation, condensing said impurities in a condenser connected with the head of said column and withdrawing said impurities from the base of said condenser at the desired rate.

8. In the process of dehydrating organic liquids by azeotropic distillation employing an entraining agent which forms a ternary azeotropic mixture with water and the organic liquid to be dehydrated, the steps of first decanting the condensed ternary mixture of minimum boiling point at a temperature approximately equal to the temperature of the still head, withdrawing a proportion of the aqueous layer formed by said first decantation, cooling said aqueous layer, subsequently decanting said aqueous layer when cold, returning the entraining agent received from said subsequent decantation to the dehydrating column and refluxing within the dehydrating column the entrainer layer formed by said first decantation together with the remaining proportion of the aqueous layer formed by said first decantation.

9. In the process of dehydrating organic liquids by azeotropic distillation employing an entraining agent which forms a ternary azeotropic mixture with water and the organic liquid to be dehydrated, the steps of first decanting the condensed ternary mixture of minimum boiling point within the main dehydrating column, one or more plates below the top of said column, and at a temperature approximately equal to the temperature of the still head, withdrawing a proportion of the aqueous layer formed by said first decantation, cooling said aqueous layer, subsequently decanting said aqueous layer when cold, returning the entraining agent received from said subsequent decantation directly to the dehydrating column, treating the aqueous layer from said subsequent decantation in a rectifying column and returning the rectified organic liquid so obtained directly to the main dehydrating column and refluxing on to the plates of the main dehydration column situated below the point where said first decantation occurs, the entrainer layer formed by said first decantation together with the remaining proportion of the aqueous layer formed by said first decantation.

HENRI MARTIN GUINOT.